United States Patent
Engström

(10) Patent No.: US 8,188,995 B2
(45) Date of Patent: May 29, 2012

(54) METHODS AND APPRATUS FOR ESTIMATING CELL RADIUS IN A MOBILE TELECOMMUNICATIONS NETWORK

(75) Inventor: Stefan Engström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1009 days.

(21) Appl. No.: 11/915,054

(22) PCT Filed: May 25, 2005

(86) PCT No.: PCT/SE2005/000771
§ 371 (c)(1),
(2), (4) Date: Nov. 20, 2007

(87) PCT Pub. No.: WO2006/126917
PCT Pub. Date: Nov. 30, 2006

(65) Prior Publication Data
US 2008/0194265 A1    Aug. 14, 2008

(51) Int. Cl.
*G06F 17/00*    (2006.01)
(52) U.S. Cl. ........ 345/418; 345/420; 345/428; 455/429; 455/513; 455/67.11
(58) Field of Classification Search .................. 455/446, 455/561, 562.1, 443, 429, 513, 67.11, 67.7, 455/422.1; 345/418, 420
See application file for complete search history.

(56) References Cited

U.S. PATENT DOCUMENTS

| | | |
|---|---|---|
| 6,173,185 B1 | 1/2001 | Bernardin et al. |
| 6,173,186 B1 | 1/2001 | Dalley |
| 2003/0040318 A1 | 2/2003 | Fattouch |
| 2003/0087641 A1 | 5/2003 | Gustafsson |
| 2004/0038714 A1* | 2/2004 | Rhodes et al. ............. 455/562.1 |
| 2005/0282540 A1* | 12/2005 | Motamedi et al. ............ 455/423 |
| 2006/0121906 A1* | 6/2006 | Stephens et al. .............. 455/446 |

OTHER PUBLICATIONS

PCT International Search Report mailed Feb. 2, 2006.
PCT Written Opinion of the International Searching Authority dated Feb. 2, 2006.
Response to Written Opinion dated Mar. 19, 2007.
PCT Demand.
PCT International Preliminary Report on Patentability completed Sep. 6, 2007.
Laiho, J., et al., "Radio Network Planning and Optimisation for UMTS," textbook, p. 103.

* cited by examiner

*Primary Examiner* — Kent Chang
*Assistant Examiner* — Keith Fang
(74) *Attorney, Agent, or Firm* — Nixon & Vanderhye, P.C.

(57) ABSTRACT

Methods and arrangements for provide for an estimation of a cell radius in a mobile telecommunications network. The arrangement comprises a processor which estimates path loss by using an arbitrary path loss estimation method wherein at least a pre-defined cell radius is used as input. The use of the arbitrary path loss estimation method results in a path loss data file comprising values associated with signal strength for pixels within the cell defined by the first cell radius. The processor also estimates a first updated cell radius by excluding pixels having a signal strength below a predetermined threshold from the cell area having the pre-defined cell radius, wherein the first updated cell radius is the cell radius of the remaining cell area when the pixels are excluded.

26 Claims, 5 Drawing Sheets

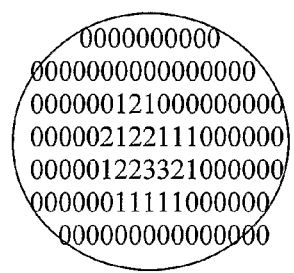
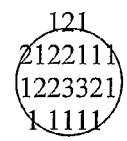
Fig. 2 a                    Fig. 2b

METHODS AND APPRATUS FOR ESTIMATING CELL RADIUS IN A MOBILE TELECOMMUNICATIONS NETWORK

This application is the U.S. national phase of International Application No. PCT/SE2005/000771 filed 25 May 2005 which designated the U.S. and the entire contents of which is hereby incorporated by reference.

FIELD OF THE INVENTION

The present invention relates to arrangements and a method for cell planning in a mobile telecommunications network. In particular, it relates to arrangements and a method for providing an estimate of the cell radius.

BACKGROUND

Planning and optimization of mobile telecommunication networks results in the need for propagation models that accurately characterize the propagation of radio frequency signals in a given environment. Predictions of radio frequency signal, or radio wave, propagation are used to estimate quantities such as coverage, serving areas, interference, and so forth. These quantities, in turn, are used to arrive at equipment settings, for example, channel assignments, whose goal is to optimize capacity without sacrificing the quality of the network. Accordingly, it is highly desirable to employ a propagation model that is as accurate and reliable as possible, given the geographical data used as an input to the propagation model.

A conventional approach to propagation modelling is to employ a basic analytic model designed to determine the power received by a mobile station in terms of the power transmitted by a base station, the base station antenna gain, and the mobile station antenna gain. Once the transmitted power and the antennas are selected, the propagation model reduces to evaluating the path loss of the radio frequency signal. Thus, it is highly desirable to compute the path loss as accurately as possible. The path loss is dependent of the distance from transmitting the base station, therefore, the cell radius is one of the required input parameters when calculating the path loss.

In general, path loss is the decrease, or attenuation, of the power of a signal usually occurring as a result of absorption, reflection, diffusion, scattering, diffraction, or dispersion, from an original level. In a mobile communication network, path loss may be determined from several components. For example, path loss may be a combination of distance dependent path loss, path loss due to terrain obstacles, path gain (or loss) due to sloping terrain, path gain caused by over-water propagation enhancement, path loss due to rain attenuation, and/or path loss due to street orientation relative to the propagation path.

A site is herein in this specification defined as the physical location of the base station. A site has several antennas attached to it. The network can see these antennas as one entity or several entities. This means that a signal is split between different antennas or different signals are transmitted to different antennas. The entity or entities are defined as cells and the antennas serving the same signal are defined as a sector. Usually a site has 3 sectors with 2 cells per sector for GSM and 1 cell per frequency for CDMA related networks. The cell radius is the distance from the base station to a point where a signal transmitted from the base station is estimated to be received just below a predefined signal strength. FIG. 1 is a view from a cell planning tool showing the signal strength of GSM and WCDMA 3 sector sites, respectively. It should however be noted that the area covered by the cell defined by cell radius does not determine the area served by the cell. Thus, a mobile terminal located within the cell may be served by another cell.

Currently when a user wants to calculate the path loss by using a cell planning tool the user determines arbitrarily a global cell radius. (An alternative to the global cell radius, is to let the user manually set a cell radius for each cell. A network of one operator may comprise more than 5000 cells, thus the manual cell radius setting would be too time consuming.) That means that the path loss is calculated for pixels within the area defined by this cell radius. This global cell radius is normally determined to be quite large so the user can be sure that no important signals are ignored due to a too small selected distance.

Since every cell has a unique path loss signature, some cells will match the user-defined global cell radius while some other will have a much shorter cell radius than the determined global cell radius. These other cells should therefore have a much shorter cell radius compared to, the global cell radius. The cell radius that should be used is called the actual cell radius.

As mentioned above, the cell planning tool performs path loss calculations up to this user defined distance (i.e. the global radius) from the base station, which implies that the performed calculations for pixels at a distance that are further from the base station than the actual radius are not required. The time required for calculating the path loss has a quadratic relationship to the distance. For example, if it takes 40 minutes to calculate a 30 km cell radius it only takes 10 minutes to calculate 15 km cell radius.

Thus it would be desirable to obtain a method and arrangements for providing an estimated cell radius that is close to the actual cell radius.

U.S. Pat. No. 6,173,186 discloses a method for estimating coverage of a cell. U.S. Pat. No. 6,173,186 provides a cell radius estimation method using path loss and signal source distance data. The method determines the path loss and ranges data from a plurality of predetermined locations within said cell and applies a fixed gradient line fit to the data to obtain cell radius estimates and to determine models for one or more geomorphology classifications. A drawback with this method is that the estimation requires access to a map, denoted geomorphology data. Loading the geomorphology data into the estimation processor requires a significant amount of time.

SUMMARY

Thus, an object with the present invention is to achieve a method and arrangements for providing an estimation of the cell radius in mobile telecommunications network without requirement of geomorphology data.

A method according to the technology disclosed herein makes it possible to provide an estimation of the cell radius in mobile telecommunications network without requirement of geomorphology data. The method comprises the act of estimating a first updated cell radius by excluding pixels having a signal strength, e.g. calculated by using a conventional method for determining the path loss, below a predetermined threshold from the cell area having the pre-defined cell radius, wherein the first updated cell radius is the cell radius of the remaining cell area when said pixels are excluded.

An arrangement according to the technology disclosed herein makes it possible to provide an estimation of the cell radius in mobile telecommunications network without requirement of geomorphology data. The arrangement comprises means for estimating a first updated cell radius by excluding pixels having a signal strength, e.g. calculated by using a conventional method for determining the path loss, below a predetermined threshold from the cell area having the pre-defined cell radius, wherein the first updated cell radius is the cell radius of the remaining cell area when said pixels are excluded.

An example advantage with the technology disclosed is that a cell planning tool according to the technology disclosed herein will be more attractive since the time for calculating the path loss performance will be reduced quite significantly.

DRAWINGS

FIG. 2a illustrates schematically a path loss file in the pre-defined global radius.

FIG. 2b illustrates schematically the actual cell radius derivable from inspection of the path loss file according to an example embodiment.

DETAILED DESCRIPTION

The technology disclosed herein provides methods and arrangements for providing an estimate of the cell radius that is close to the actual cell radius. The estimated cell radius may be used for path loss calculations.

First, an initial estimation of the cell radius is performed. The initially estimated cell radius is denoted $d_{initial}$. Any arbitrarily path loss estimation method may be used for this initial estimation. The arbitrarily path loss estimation method may use the user determined global cell radius, or another pre-defined cell radius. An example of a conventional path loss estimation method is the Okumura Hata model. Further information of the Okumura Hata model can be found in the textbook "Radio Network Planning And Optimisation For UMTS" by Laiho et. al., page 103. The Okumura Hata model considers the effective antenna height, the distance between base station antenna and mobile, frequency, mobile height loss, attenuation due to clutter type, type of area, mobile antenna height and knife edge diffraction loss.

The arbitrarily (e.g., arbitrary) path loss estimation method results in a path loss data file comprising estimated signal strength values for a pre-defined number of pixels within the cell area defined by the global cell radius. The initial path loss files will most certain be filled to some extent with zeros or empty entries due to the fact that the signal strengths are below a predetermined limit wherein the signal strength below the predetermined limit is far too weak to make an impact in the network performance even if the theoretical cell range has been used as shown in FIG. 2a. As discussed above it would be desirable not to have to perform calculations for useless pixels having zeros or empty entries or signal strengths below the predetermined limit by excluding these pixels.

Figure 1:
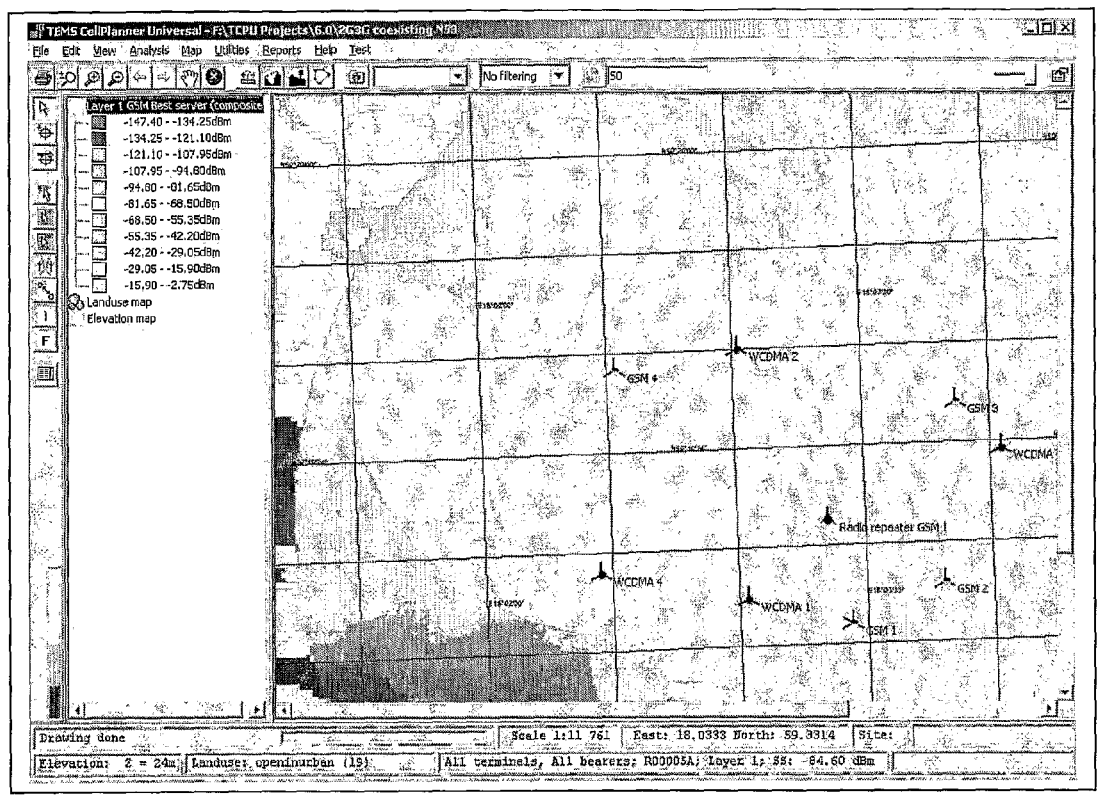
FIG. 1 is a view from a cell planning tool showing the signal strength of GSM and WCDMA 3 sector sites, respectively.
Figure 2C:
FIG. 2c shows path loss calculations for a site.

The next step is to investigate the path loss files in order to extract the actual cell radius, also denoted the first updated cell radius. The determination of the actual cell radius is based on the cell radius defining the remaining cell area when the useless pixels are excluded from the cell area defined by the initial cell radius as illustrated by FIG. 2b. That implies that subsequent path loss calculation based on the actual cell radius will not contain as many zeros or empty entries or too low signal strengths as the initial path loss files. This actual cell radius will be smaller than the initial estimated cell radius. The site shown in FIG. 2c can be seen as a vertical line at the centre of the picture. The lighter grey area around the site represents signals with a signal strength above −105 dBm. The darker area outside this covered area within the circle is the area where path loss has been calculated but has a signal strength below −105 dBm. Time has been wasted to calculate this area. In this example the cell radius, the radius of the circle, was set to 10 km which is not an unrealistic coverage range in countryside areas. However, this site was located downtown and had a realistic downtown coverage range.

This new cell radius, called actual cell radius denoted $d_{acr}$ will now be the preferred cell radius until a change of the antenna configuration has occurred.

If an antenna configuration has occurred the following acts or steps are taken to calculate a new updated $d_{acr}$ according to example embodiments of the technology described herein.

An Antenna Downtilt and/or Decrease in Output Power Has Occurred

According to a first embodiment the following steps are performed if an antenna downtilt and/or decrease in output power has occurred.

1. Run the path loss calculation with $d_{acr}$ derived from the exclusion of the useless pixels by using the conventional path loss estimation method.
2. Investigate the new resulting path loss file to determine a new actual cell radius by excluding useless pixels in the same manner as above. This new cell radius will be smaller than current one since an antenna downtilt and/or decrease in output power has been performed.

An Antenna Uptilt and/or Increase in Output Power Has Occurred

If an antenna uptilt has occurred, a new estimated $d_{acr,new}$ is calculated with the equation 1 according to a second embodiment of the technology described herein. $d_{acr,current}$ is a current actual cell radius, calculated e.g., by excluding useless pixels from the path loss data file as described above. (old tilt—new tilt)/old tilt is the tilt difference divided with the old tilt.

$$d_{acr,new} = d_{acr,current} + (d_{adjusted} - d_{acr,current}) \times (\text{old tilt} - \text{new tilt})/\text{old tilt} \quad \text{Equation 1}$$

If the output power has increased a new estimated $d_{acr,new}$ is calculated with equation 2 according to a third embodiment of the invention. $d_{acr,current}$ is a current actual cell radius, calculated e.g., by excluding useless pixels from the path loss data file as described above. (new power—old power)/old power is the power difference divided with the old power.

$$d_{acr,new} = d_{acr,current} + (d_{adjusted} - d_{acr,current}) \times (\text{new power} - \text{old power})/\text{old power} \quad \text{Equation 2}$$

If both an antenna uptilt and an increase of the output power have occurred the new actual cell radius denoted $d_{acr,new2}$ is according to equation 3:

$$d_{acr,new2} = d_{acr,new}(\text{from equation 1}) + d_{acr,new}(\text{from equation 2}) - d_{acr,current} \quad \text{Equation 3}$$

$d_{adjusted}$ is a cell radius that is adjusted based on the antenna configuration change. The value of $d_{adjusted}$ is determined such that all useful signals are considered e.g. by using previous experiences. The received signal strength at a specific location has to be strong enough such that it is useful to include the pixels of that location within the cell area, defined by the cell radius, in the analysis. If the received signal is below a predetermined threshold, the signal is considered to be useless. For GSM the mobile sensitivity is roughly −102 dBm. An 8 dB margin for interference calculation is preferably added implying that the signal has to be stronger than −110 dBm in order to be useful. For WCDMA the sensitivity is better than GSM, from −105 dBm for P384 (a packet data service providing 384 kilobit per second) to −118 dBm for voice. It should be noted that the above mentioned signal strengths are only examples and is preferably defined by the user. Thus, $d_{adjusted}$ can be seen as an intelligent guessing of the cell radius after the change of the antenna configuration has occurred.

$d_{acr,new}$, is an updated cell radius to be used in an additional path loss estimation calculation in order to obtain a more correct cell radius by inspecting the path loss data file. $d_{acr,new}$ is hence closer to the actual cell radius than $d_{acr,current}$, when the antenna change has occurred, which may result in a faster path loss calculation.

Thus, if an antenna uptilt and/or increase in output power has occurred:
1. Calculate an estimated $d_{acr,new}$ with the equation 1, 2 or 3.
2. Run the path loss calculation by using an arbitrarily path loss calculation method with the new cell radius $d_{acr,new}$ derived from equation 1, 2 or 3.
3. Investigate the path loss file to determine a new actual cell radius by excluding useless pixels as described above wherein the new actual cell radius may be used for path loss calculations.

An Antenna Azimuth <5° Has Occurred.

If the antenna azimuth is changed less than 5° perform the steps below according to a fourth embodiment of the technology disclosed herein:
1. Double the current $d_{acr}$, i.e. $d_{acr,new}=d_{acr,current}\times 2$
2. Run the path loss calculation by using an arbitrarily path loss estimation method and use the new $d_{acr,new}$ as the cell radius.
3. Investigate the path loss file and exclude any useless pixels to determine a new actual cell radius, $d_{acr}$, as described above.

An Antenna Azimuth >5° and/or an Antenna Height Change Has Occurred.

If the antenna azimuth is changed more than 5° and/or a change of the antenna height has occurred, perform the steps below according to the technology disclosed herein:
1. Calculate path loss by using a conventional path loss estimation method, e.g. Okumura Hata by using the initial estimated cell radius, $d_{initial}$.
2. Investigate the path loss file and exclude any useless pixels to determine an actual cell radius, $d_{acr}$, as described above.

Figure 3:
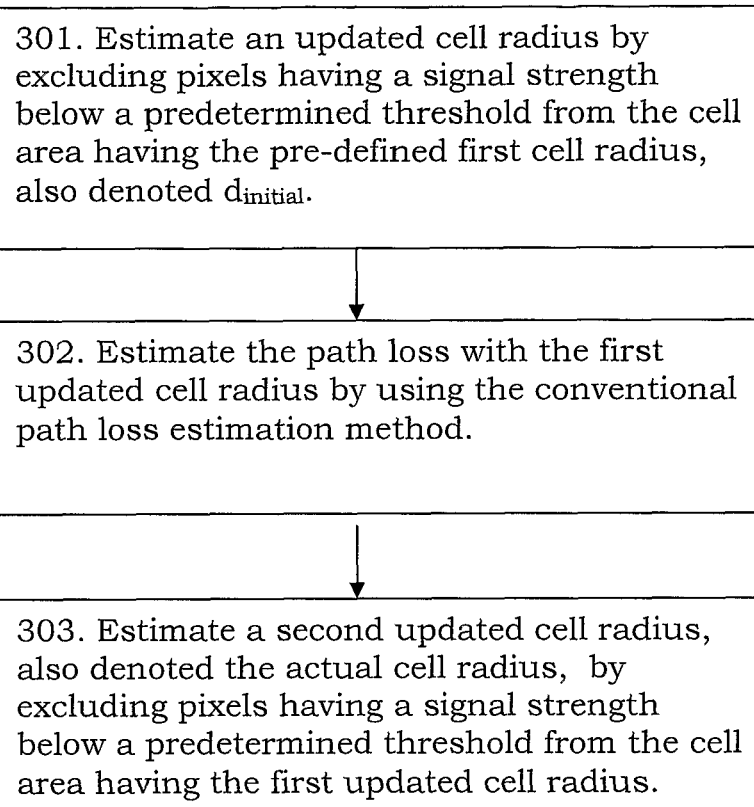
FIG. 3 is a flowchart illustrating an example the method of the technology disclosed herein.

Thus, the method according to the technology disclosed herein illustrated in FIG. 3 comprises the act or step of:

301. Estimate an updated cell radius by excluding pixels having a signal strength below a predetermined threshold from the cell area having the pre-defined first cell radius, also denoted $d_{initial}$.

The first embodiment of the technology disclosed herein illustrated in FIG. 3 comprises the further acts or steps of:

302. Estimate the path loss with the first updated cell radius by using the conventional path loss estimation method.

303. Estimate a second updated cell radius, also denoted the actual cell radius, by excluding pixels having a signal strength below a predetermined threshold from the cell area having the first updated cell radius, wherein the first updated cell radius is the cell radius of the remaining cell area when said pixels are excluded.

Figure 4:
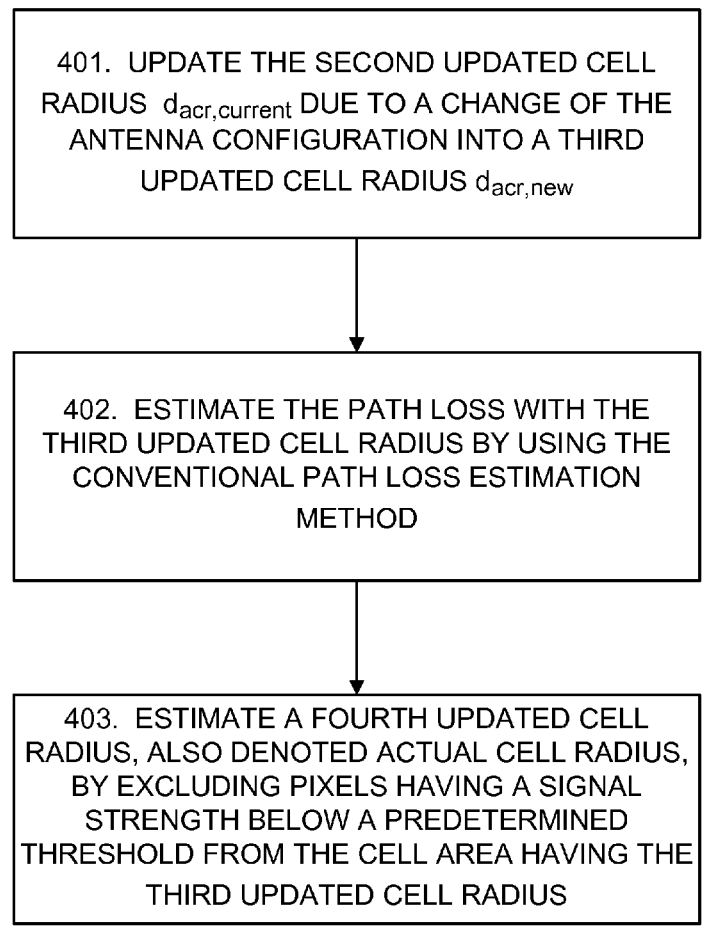
FIG. 4 is a flowchart illustrating example embodiments of the technology disclosed herein.

The second, third and fourth embodiments of the technology disclosed herein illustrated in FIG. 4 comprise the further ask or steps of:

401. Update the first updated cell radius $d_{acr,current}$ due to a change of the antenna configuration into a third updated cell radius $d_{acr,new}$.

402. Estimate the path loss with the third updated cell radius by using the conventional path loss estimation method, and 403. Estimate a fourth updated cell radius, also denoted actual cell radius, by excluding pixels having a signal strength below a predetermined threshold from the cell area having the third updated cell radius, wherein the fourth updated cell radius is the cell radius of the remaining cell area when said pixels are excluded.

The method may be implemented in a computer program product. The computer program product is directly loadable into the internal memory into a processor of a cell planning tool comprising the software portions for performing the steps according to the method described above.

The computer program product is stored on a computer usable medium comprising readable program for causing the processor of the cell planning tool to control the execution of the steps according to the method described above.

Furthermore, the technology disclosed herein also relates to an arrangement for estimating the cell radius according to the method of the technology disclosed herein. According to one example embodiment, the arrangement is implemented in a cell planning tool.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method for providing an estimation of a cell radius in a mobile telecommunications network, comprising:
estimating path loss by using an arbitrary path loss estimation method wherein at least a pre-defined cell radius is used as input, the use of the arbitrary path loss estimation method resulting in a path loss data file comprising values associated with signal strength for pixels within the cell defined by the pre-defined cell radius;
estimating a first updated cell radius by excluding pixels having a signal strength below a first predetermined threshold from a cell area having the pre-defined cell radius, wherein the first updated cell radius is a cell radius of a first remaining cell area when said pixels having a signal strength below the first predetermined threshold are excluded;
estimating the path loss within the first updated cell radius by using a conventional path loss estimation method; and
estimating a second updated cell radius by excluding pixels having a signal strength below a second predetermined threshold from the cell area having the first updated cell radius, wherein the second updated cell radius is a cell radius of a second remaining cell area when said pixels having a signal strength below the second predetermined threshold are excluded.

2. The method of claim 1, further comprising:
updating the second updated cell radius due to a changed antenna configuration into a third updated cell radius;
estimating the path loss within the third updated cell radius by using a conventional path loss estimation method; and estimating a fourth updated cell radius by excluding pixels having a signal strength below a third predetermined threshold from a cell area having the first updated cell radius, wherein the fourth updated cell radius is a cell radius of a second remaining cell area when said pixels having a signal strength below the third predetermined threshold are excluded.

3. The method of claim 2, wherein the changed antenna configuration is an antenna uptilt.

4. The method of claim 1, wherein the first updated cell radius is updated into a third updated cell radius by using the equation:

$$d_{acr,new} = d_{acr,current} + (d_{adjusted} - d_{acr,current}) \times (\text{old tilt} - \text{new tilt})/\text{old tilt}$$

wherein,
$d_{acr,new}$=the third updated cell radius,
$d_{acr,current}$=the first updated cell radius,
$d_{adjusted}$=the cell radius that is adjusted based on a changed antenna configuration,
and (old tilt−new tilt)/old tilt=the tilt difference divided with the old tilt.

5. The method of claim 2, wherein the changed antenna configuration comprises an occurrence of an increase in output power.

6. The method of claim 5, wherein the first updated cell radius is updated into a third updated cell radius by using the equation:

$$d_{acr,new} = d_{acr,current} + (d_{adjusted} - d_{acr,current}) \times (\text{new power} - \text{old power})/\text{old power wherein,}$$

$d_{acr,new}$=the third updated cell radius,
$d_{acr,current}$=the first updated cell radius,
$d_{adjusted}$=the cell radius that is adjusted based on the changed antenna configuration, and
(new power−old power)/old power=the power difference divided with the old power.

7. The method of claim 2, wherein the changed antenna configuration comprises an increase in output power and an occurrence of an antenna uptilt.

8. The method of claim 7, wherein the first updated cell radius is updated into a third updated cell radius by using the equation:

$$d_{acr,new2} = d_{acr,new}(\text{from 1}) + d_{acr,new}(\text{from 2}) - d_{acr,current}$$

wherein $d_{acr,new}$ (from 1)=$d_{acr,current}$ ($d_{adjusted}$−$d_{acr,current}$)×(old tilt−new tilt)/old tilt and
$d_{acr,new}$(from 2)=$d_{acr,current}$+($d_{adjusted}$−$d_{acr,current}$)×(new power−old power)/old power
(2)
wherein,
$d_{acr,new2}$=the third updated cell radius,
$d_{acr,current}$=the first updated cell radius,
$d_{adjusted}$=a cell radius that is adjusted based on the antenna configuration,
(new power−old power)/old power=a power difference divided with the old power, and (old tilt−new tilt)/old tilt=a tilt difference divided with the old tilt.

9. The method of claim 2, wherein the changed antenna configuration is that a change of the antenna azimuth less than 5° has occurred.

10. The method of claim 9, wherein the first updated cell radius is updated into a third updated cell radius by using the equation:

$$d_{acr,new} = d_{acr,current} \times 2$$

wherein
$d_{acr,new}$=the third updated cell radius, and
$d_{acr,current}$=the first updated cell radius.

11. The method of claim 2, wherein the changed antenna configuration is an antenna downtilt and/or a decrease in output power.

12. An arrangement for providing an estimation of a cell radius in a mobile telecommunications network, the arrangement comprising a processor which executes instructions stored on non-transitory computer-usable medium for performing the acts of:

estimating path loss by using an arbitrary path loss estimation method wherein at least a pre-defined cell radius is used as an input, the use of the arbitrary path loss estimation method resulting in a path loss data file comprising values associated with signal strength for pixels within a cell defined by the pre-defined cell radius, estimating a first updated cell radius by excluding pixels having a signal strength below a first predetermined threshold from a cell area having the pre-defined cell radius, wherein the first updated cell radius is the cell radius of a first remaining cell area when said pixels having a signal strength below the first predetermined threshold are excluded;

wherein the processor also estimates the path loss with the first updated cell radius by using a conventional path loss estimation method and estimates a second updated cell radius by excluding pixels having a signal strength below a second redetermined threshold from the cell area having the first updated cell radius, wherein the second updated cell radius is the cell radius of a second remaining cell area when said pixels having a signal strength below the second predetermined threshold are excluded.

13. The arrangement of claim 12, wherein the processor updates the second updated cell radius due to a changed antenna configuration into a third updated cell radius, estimates path loss within the third updated cell radius by using a conventional path loss estimation method, and estimates a fourth updated cell radius by excluding pixels having a signal strength below a third predetermined threshold from the cell area having the third updated cell radius, wherein the fourth updated cell radius is the cell radius of the remaining cell area when said pixels having a signal strength below the third predetermined threshold are excluded.

14. The arrangement of claim 13, wherein the changed antenna configuration is an antenna downtilt and/or a decrease in output power.

15. The arrangement of claim 13, wherein the changed antenna configuration is an antenna uptilt.

16. The arrangement of claim 15, wherein the processor updates the first updated cell radius into a third updated cell radius by using the equation:

$$d_{acr,new} = d_{acr,current} + (d_{adjusted} - d_{acr,current}) \times (\text{old tilt} - \text{new tilt})/\text{old tilt}$$

wherein,
$d_{acr,new}$=the third updated cell radius,
$d_{acr,current}$=the first updated cell radius,
$d_{adjusted}$=a cell radius that is adjusted based on the changed antenna configuration, and
(old tilt−new tilt)/old tilt=a tilt difference divided by an old tilt.

17. The arrangement of claim 13, wherein the changed antenna configuration comprises an occurrence of an increase in output power.

18. The arrangement of claim 17, wherein the processor updates the first updated cell radius into a third updated cell radius by using the equation:

$$d_{acr,new} = d_{acr,current} + (d_{adjusted} - d_{acr,current}) \times (\text{new power} - \text{old power})/\text{old power}$$

wherein,
$d_{acr,new}$=the third updated cell radius,
$d_{acr,current}$=the first updated cell radius,
$d_{adjusted}$=the cell radius that is adjusted based on the changed antenna configuration, and
(new power−old power)/old power=a power difference divided by an old power.

19. The arrangement of claim 13, wherein the changed antenna configuration comprises an increase in output power and an occurrence of an antenna uptilt.

20. The arrangement of claim 19, wherein the processor updates the first updated cell radius into a third updated cell radius by using the equation:

$$d_{acr,new2} = d_{acr,new}(\text{from 1}) + d_{acr,new}(\text{from 2}) - d_{acr,current}$$

wherein,
$d_{acr,new}(\text{from 1}) = d_{acr,current} + (d_{adjusted} - d_{acr,current}) \times (\text{old tilt} - \text{new tilt})/\text{old tilt}$ and
$d_{acr,new}(\text{from 2}) = d_{acr,current} + (d_{adjusted} - d_{acr,current}) \times (\text{new power} - \text{old power})/\text{old power}$ (2)
wherein,
$d_{acr,new2}$=the third updated cell radius,
$d_{acr,current}$ the first updated cell radius,
$d_{adjusted}$=a cell radius that is adjusted based on the changed antenna configuration,
(new power−old power)/old power=the power difference divided with the old power, power, and(old tilt−new tilt)/old tilt=the tilt difference divided with the old tilt.

21. The arrangement of claim 13, wherein the changed antenna configuration is that a change of the antenna azimuth less than 5° has occurred.

22. The arrangement of claim 21, wherein the processor updates the first updated cell radius into a third updated cell radius by using the equation:

$$d_{acr,new} = d_{acr,current} \times 2$$

wherein
$d_{acr,new}$=the third updated cell radius, and
$d_{acr,current}$=the first updated cell radius.

23. The arrangement of claim 13, wherein the changed antenna configuration is an antenna downtilt and/or a decrease in output power.

24. An arrangement for providing an estimation of a cell radius in a mobile telecommunications network, the arrangement comprising a processor which executes instructions stored on non-transitory computer-usable medium for performing the acts of:
estimating path loss by using an arbitrary path loss estimation method wherein at least a pre-defined cell radius is used as input, the use of the arbitrary path loss estimation method resulting in a path loss data file comprising values associated with signal strength for pixels within a cell defined by the pre-defined cell radius; and
estimating a first updated cell radius by excluding pixels having a signal strength below a predetermined threshold from a cell area having the pre-defined cell radius, wherein the first updated cell radius is the cell radius of a remaining cell area when said pixels having a signal strength below the predetermined threshold are excluded;
wherein the arrangement is implemented in a cell planning tool for a mobile telecommunication network.

25. A computer program product stored on a computer usable non-transitory medium comprising readable program for causing a processor of a cell planning tool to control execution of the acts of:
an input, the use of the arbitrary path loss estimation method resulting in a path loss data file comprising values associated with signal strength for pixels within the cell defined by the pre-defined cell radius: and
estimating a first updated cell radius by excluding pixels having, a signal strength below a predetermined threshold from a cell area having the pre-defined cell radius, wherein the first updated cell radius is a cell radius of a remaining cell area when said pixels having a signal strength below the predetermined threshold are excluded;
estimating the path loss within the first updated cell radius by using a conventional path loss estimation method; and
estimating a second updated cell radius by excluding pixels having a signal strength below a second predetermined threshold from the cell area having the first updated cell radius, wherein the second updated cell radius is a cell radius of a remaining cell area when said pixels having a signal strength below the second predetermined threshold are excluded.

26. The computer program product of claim 25, wherein the processor executes the instructions stored on non-transitory computer-usable medium for performing the further acts of:
updating the second updated cell radius due to a changed antenna configuration into a third updated cell radius;
estimating the path loss within the third updated cell radius by using a conventional path loss estimation method; and
estimating a fourth updated cell radius by excluding pixels having a signal strength below a third predetermined threshold from a cell area having the third updated cell radius, wherein the fourth updated cell radius is a cell radius of a remaining cell area when said pixels having a signal strength below the third predetermined threshold are excluded.

* * * * *